US012686066B2

(12) United States Patent
Onchi

(10) Patent No.: US 12,686,066 B2
(45) Date of Patent: Jul. 21, 2026

(54) ROTARY TOOL AND METHOD FOR MANUFACTURING MACHINED PRODUCT

(71) Applicant: KYOCERA CORPORATION, Kyoto (JP)

(72) Inventor: Suguru Onchi, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 323 days.

(21) Appl. No.: 18/695,358

(22) PCT Filed: Sep. 29, 2022

(86) PCT No.: PCT/JP2022/036405
§ 371 (c)(1),
(2) Date: Mar. 26, 2024

(87) PCT Pub. No.: WO2023/054574
PCT Pub. Date: Apr. 6, 2023

(65) Prior Publication Data
US 2024/0408680 A1      Dec. 12, 2024

(30) Foreign Application Priority Data
Oct. 1, 2021      (JP) ................................. 2021-162930

(51) Int. Cl.
*B23C 5/10*           (2006.01)
(52) U.S. Cl.
CPC ............ *B23C 5/10* (2013.01); *B23C 2210/40* (2013.01); *B23C 2210/54* (2013.01)

(58) Field of Classification Search
CPC .................................................. B23C 2210/54
See application file for complete search history.

(56) References Cited

U.S. PATENT DOCUMENTS 7,780,379 B2 * 8/2010 Turrini ...................... B23C 5/10
                                                        407/53
2024/0408680 A1 * 12/2024 Onchi ........................ B23C 5/10

FOREIGN PATENT DOCUMENTS

| CN | 208712964 U | * | 4/2019 | |
| JP | 2014087891 A | * | 5/2014 | |
| JP | 2020163555 A | * | 10/2020 | |
| JP | 2021146486 A | * | 9/2021 | |
| JP | 2023150032 A | * | 10/2023 | ........... B23C 5/1009 |
| WO | WO-2016068064 A1 | * | 5/2016 | ............... B23C 5/10 |
| WO | WO-2018176750 A1 | * | 10/2018 | ............... B23C 5/12 |

* cited by examiner

*Primary Examiner* — Jacob J Cigna
(74) *Attorney, Agent, or Firm* — HAUPTMAN HAM, LLP

(57)           ABSTRACT
The short flank face includes a second flank face that is adjacent to the short cutting edge rearward of a rotation axis in a rotation direction and is flat and a third flank face that is adjacent to the second flank face rearward of the rotation axis in the rotation direction and is flat. In front view of the body from the front end, a maximum value of a width of the second flank face in the direction orthogonal to the short cutting edge is smaller than a maximum value of a width of the long flank face in the direction orthogonal to the long cutting edge, and a clearance angle of the second flank face is smaller than a clearance angle of the long flank face.

12 Claims, 10 Drawing Sheets

ROTARY TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2022/036405 filed on Sep. 29, 2022, which claims priority to Japanese Patent Application No. 2021-162930, filed on Oct. 1, 2021.

TECHNICAL FIELD

The present disclosure relates to a rotary tool used for machining, for example, milling processing of a workpiece, and a method for manufacturing a machined product.

BACKGROUND OF INVENTION

Examples of known rotary tools to be used in milling processing of workpieces made of metal material include an end mill described in Patent Document 1. The end mill described in Patent Document 1 includes, for example, a ball blade as a cutting edge and a round surface as one of flank faces located along the cutting edge. The round surface is a face having a relatively small clearance angle of a plurality of flank faces. Bringing the round surface into contact with a workpiece during machining of the workpiece allows a burnishing effect to be exhibited by the round surface, in other words, the flank face and a surface roughness of a machined surface to be improved.

CITATION LIST

Patent Literature

Patent Document 1: JP 2014-087891 A

SUMMARY

A rotary tool according to an aspect of the present disclosure includes a body extending from a first end toward a second end along a rotation axis and having a cylindrical shape. The body includes: a chisel edge located on a side of the first end and intersecting the rotation axis; a long cutting edge located on a side of the first end and extending from the chisel edge toward an outer peripheral side; a long flank face that is adjacent to the long cutting edge rearward of the rotation axis in a rotation direction and is flat; a short cutting edge located on a side of the first end and extending toward an outer peripheral side from a position away from the chisel edge; and a short flank face adjacent to the short cutting edge rearward of the rotation axis in the rotation direction. The short flank face includes: a second flank face that is adjacent to the short cutting edge rearward of the rotation axis in the rotation direction and is flat; and a third flank face that is adjacent to the second flank face rearward of the rotation axis in the rotation direction and is flat. In front view of the body from the first end, a maximum value of a width of the second flank face in a direction orthogonal to the short cutting edge is smaller than a maximum value of a width of the long flank face in a direction orthogonal to the long cutting edge. A clearance angle of the second flank face is smaller than a clearance angle of the long flank face.

DESCRIPTION OF EMBODIMENTS

Figure 1:
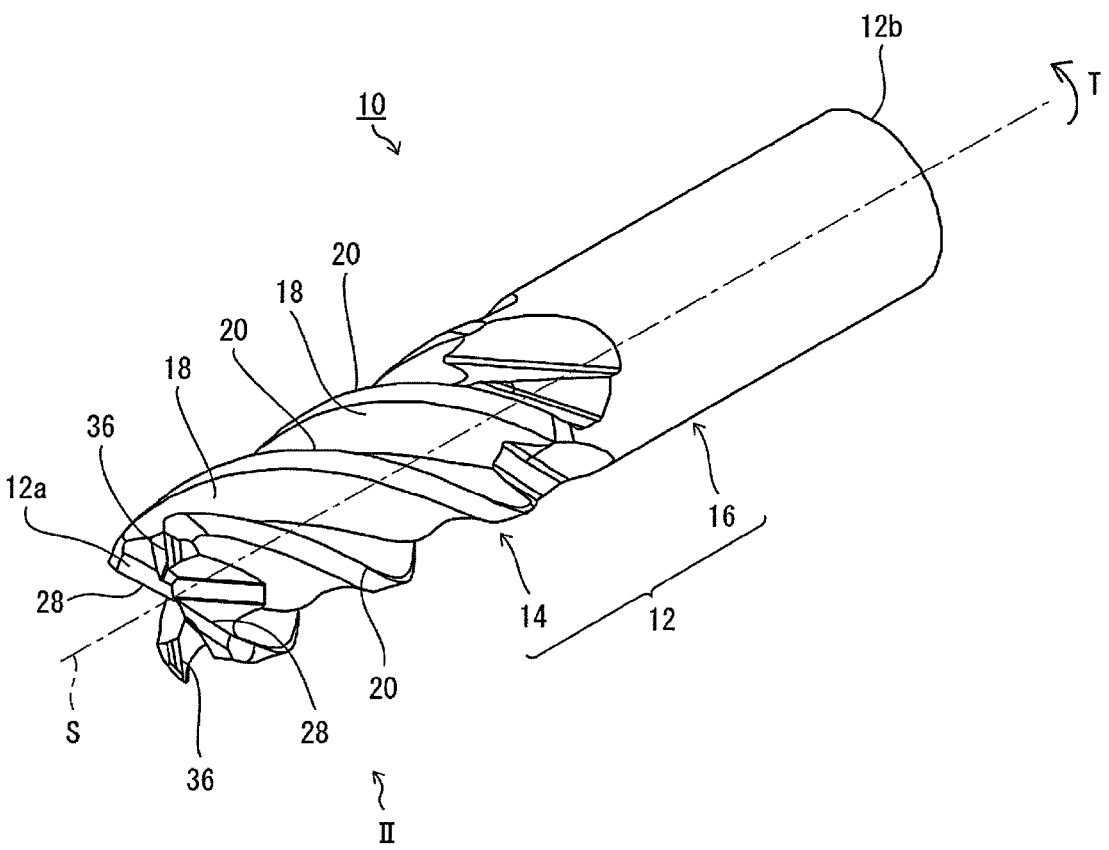
FIG. 1 is a perspective view of an end mill according to the embodiment.

Hereinafter, with reference to the drawings, detailed description is made on an end mill as an example of a rotary tool and a method for manufacturing a machined product according to an embodiment of the present disclosure. However, each of the figures, which will be referred to below, is a simplified representation of only components necessary for description of the embodiments, for convenience of description. Thus, the end mill as an example of a rotary tool may be provided with any components not illustrated in the referenced drawings. The dimensions of the components in the drawings do not faithfully represent the actual dimensions of the components, the dimension ratios of the components, or the like.

In the present disclosure, a rotation axis refers to a rotation axis (rotation axis center) of the rotary tool, and a circumferential direction refers to a direction around the rotation axis, in other words, a circumferential direction of an outer peripheral surface of the body. An outer peripheral side is a direction toward or a side toward the outer peripheral surface of the body. A radial direction is a direction orthogonal to the rotation axis and the circumferential direction. A radially outer side is a direction away from or a side away from the rotation axis in the radial direction. "RD" in FIGS. 6 and 7 indicates the circumferential direction.

Figure 2:
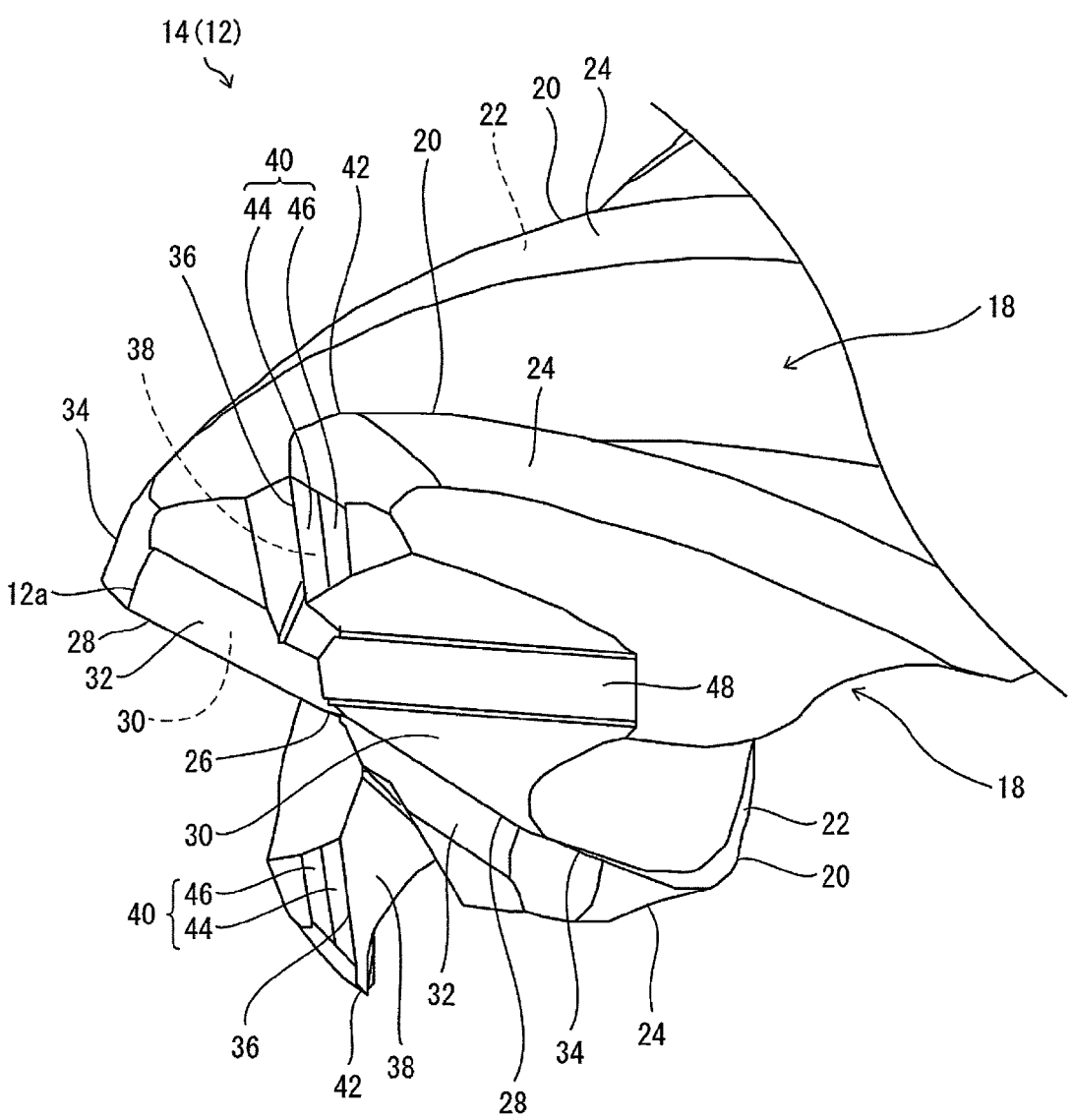
FIG. 2 is an enlarged perspective view of a part II in FIG. 1.
Figure 3:
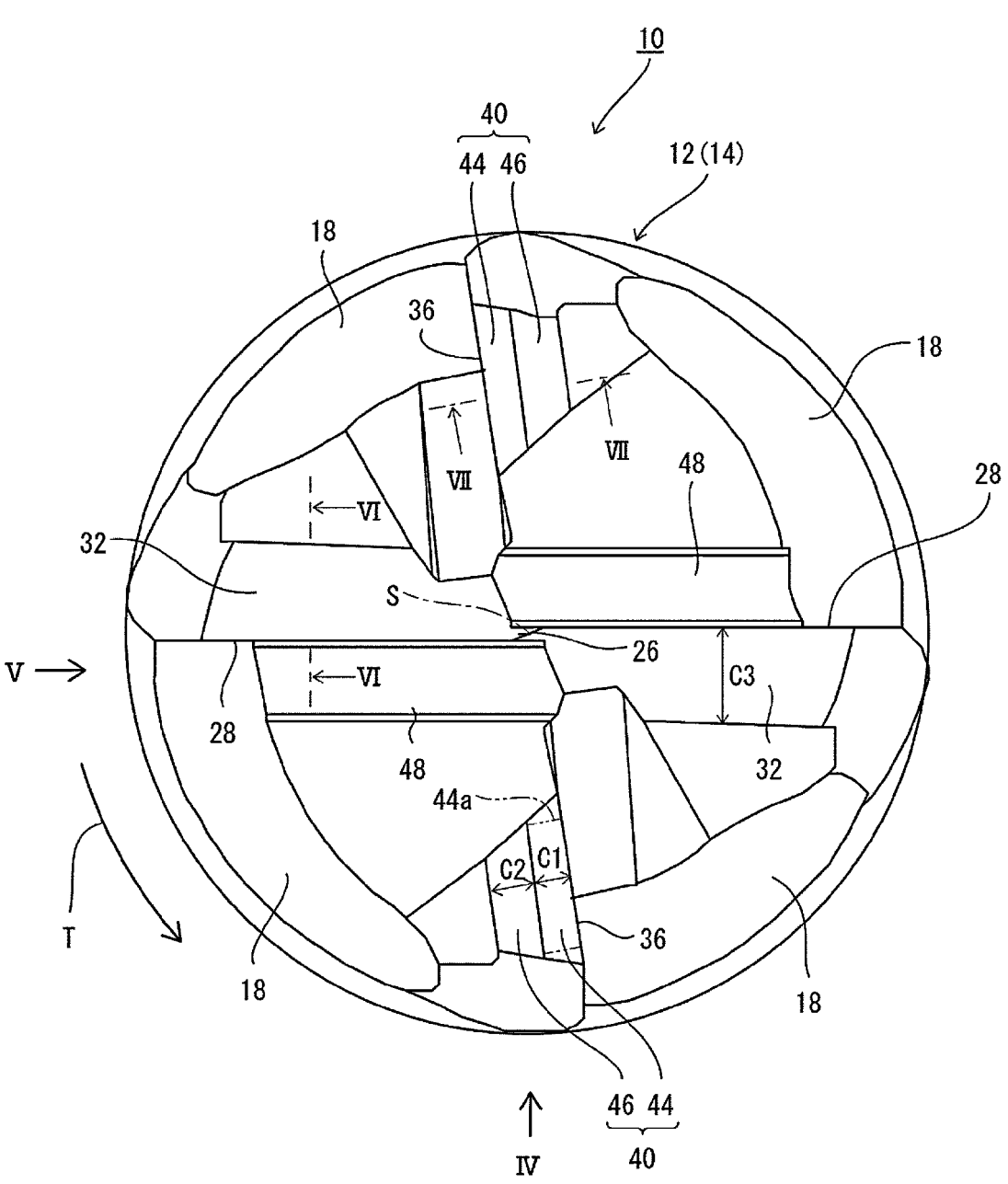
FIG. 3 is a front view of the end mill illustrated in FIG. 1.
Figure 4:
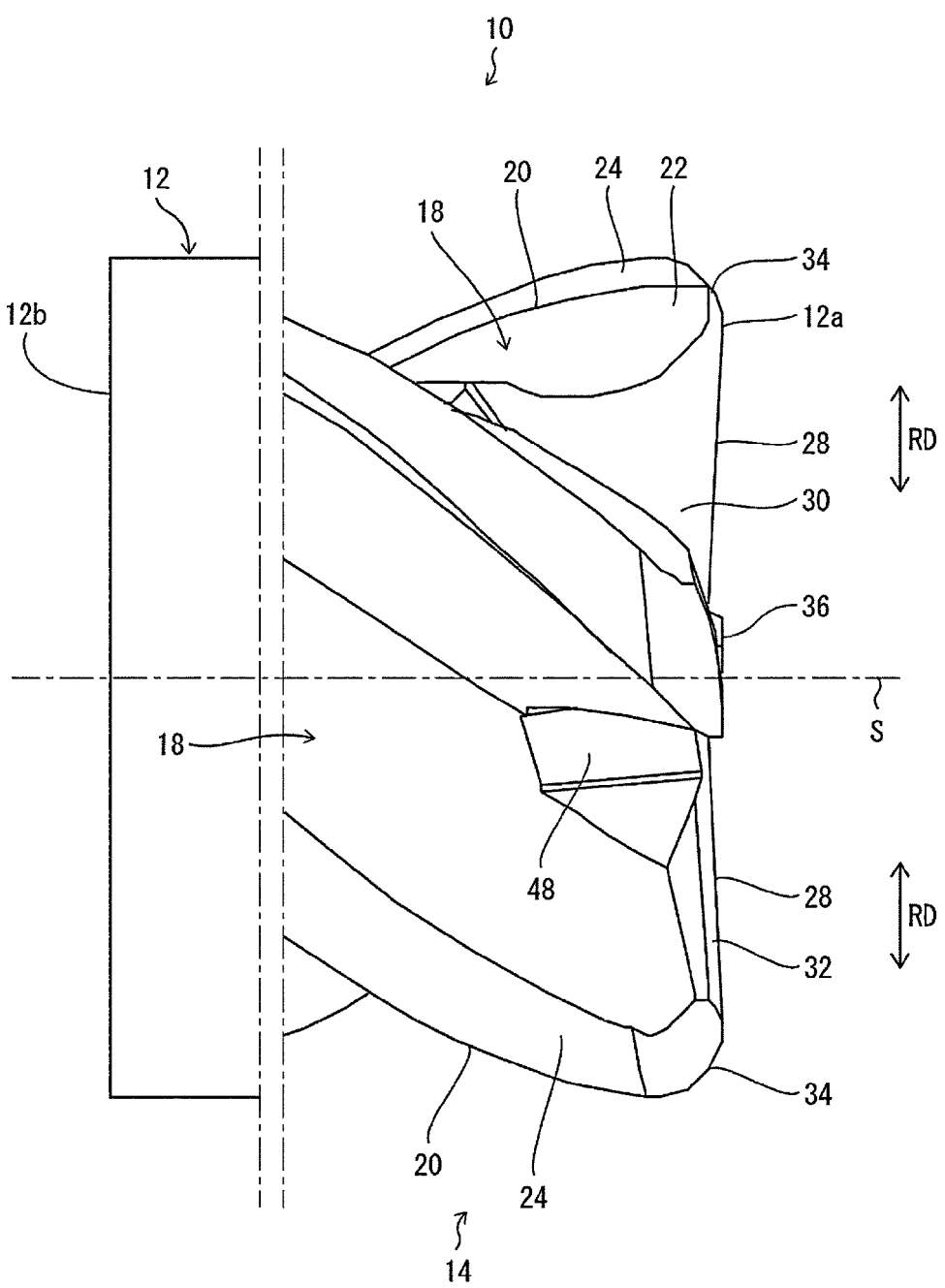
FIG. 4 is a side view of the end mill viewed along a direction IV in FIG. 3.
Figure 5:
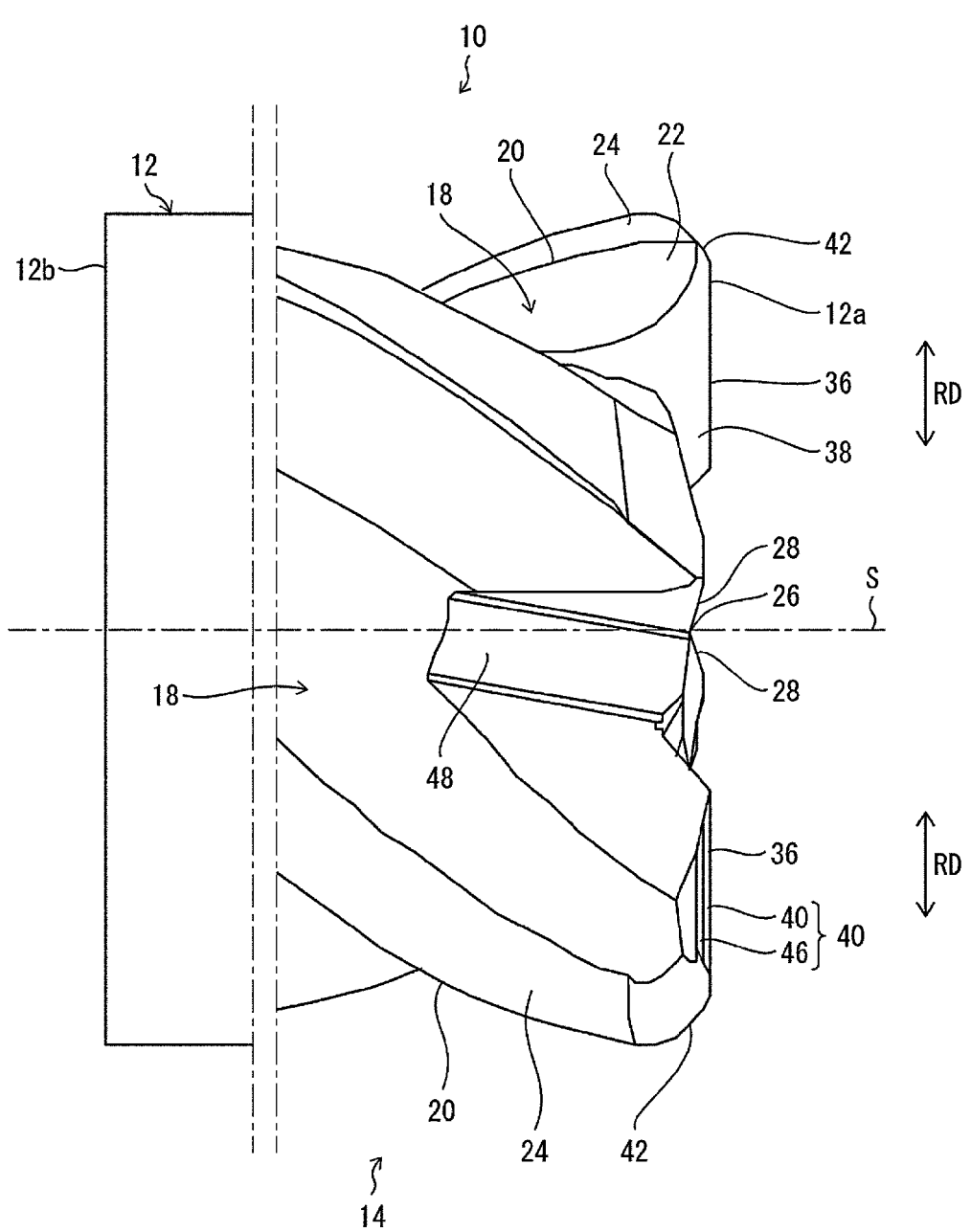
FIG. 5 is a side view of the end mill viewed along a direction V in FIG. 3.
Figure 6:
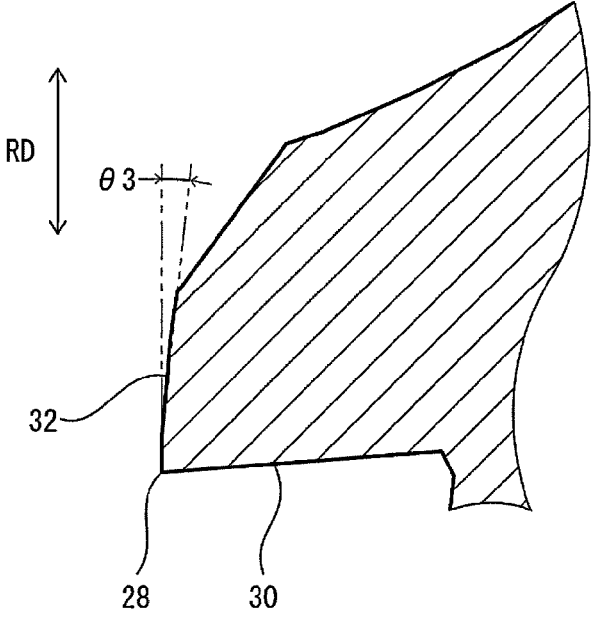
FIG. 6 is an enlarged end surface view taken along a line VI-VI in FIG. 3.
Figure 7:
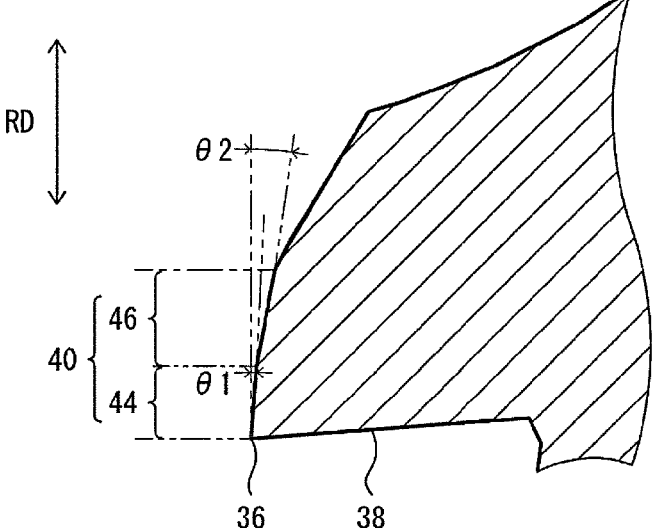
FIG. 7 is an enlarged end surface view taken along a line VII-VII in FIG. 3.

A description is made on the configuration of an end mill 10 as an example of the rotary tool of the embodiment with reference to FIGS. 1 to 7. FIG. 1 is a perspective view of the end mill according to the embodiment. FIG. 2 is an enlarged perspective view of the part II in FIG. 1. FIG. 3 is a front view of the end mill illustrated in FIG. 1. FIG. 4 is a side view of the end mill viewed along the direction IV in FIG. 3. FIG. 5 is a side view of the end mill viewed along the direction V in FIG. 3. FIG. 6 is an enlarged cross-sectional view taken along the line VI-VI in FIG. 3. FIG. 7 is an enlarged cross-sectional view taken along the line VII-VII in FIG. 3.

As illustrated in FIG. 1, the end mill 10, which is an example of the rotary tool of the present embodiment, is an end mill used for machining (milling processing) a workpiece W (see FIG. 8) made of a metal material or the like. Examples of the machining of the workpiece W include shoulder machining, grooving, R machining, and profiling. The end mill 10 is a solid end mill made of hard material, for example. Examples of the hard material include high-speed tool steel, cemented carbide alloy, ceramics, cermet, cubic boron nitride (cBN), and polycrystalline diamond (PCD). The end mill 10 may be made of only one of the materials described above, or may be made of a plurality of materials. For example, the end mill 10 may be composed of a cemented carbide alloy base coated with PCD.

The end mill 10 includes a body 12 having a cylindrical shape. The body 12 extends along a rotation axis S from a front end (first end) 12*a* toward a rear end (second end) 12*b*. The body 12 includes, on the front end 12*a* side thereof, a cutting portion 14 that comes into contact with the workpiece W (see FIG. 11) to perform machining. The body 12 includes, on the rear end 12*b* side thereof, a shank portion 16 to be mounted on a spindle of a machine tool via an arbor. If at least the cutting portion 14 is made of, for example, the above-described hard material, the end mill 10 may not be a solid end mill.

As illustrated in FIGS. 1 and 2, the cutting portion 14 has a plurality of flutes 18 for discharging chips generated by machining. The plurality of flutes 18 are located at intervals along the circumferential direction of the outer peripheral surface of the body 12, and each flute 18 extends spirally from the front end 12*a* side toward the rear end 12*b* side of the body 12. The cutting portion 14 includes an outer peripheral cutting edge 20 located at an outer peripheral end of a wall surface of each flute 18 on a side facing a rotation direction T of the rotation axis S. Each outer peripheral cutting edge 20 spirally extends from the front end 12*a* side toward the rear end 12*b* side of the body 12. The cutting portion 14 includes a rake face 22 located on the flute 18 side of each outer peripheral cutting edge 20, and a flank face 24 adjacent to each rake face 22 on the rear side in the rotation direction T of the rotation axis S (on the opposite side to the rotation direction T). Each outer peripheral cutting edge 20 is located at the intersection of each rake face 22 and each flank face 24.

As illustrated in FIGS. 2 and 3, the cutting portion 14 includes a chisel edge 26 intersecting the rotation axis S, which is located on the front end 12*a* side of the body 12. The chisel edge 26 may have a biting action on the workpiece W.

As illustrated in FIGS. 2 to 4, in the cutting portion 14, two long cutting edges 28 are located on the front end 12*a* side of the body 12 as cutting edges, in other words, as end cutting edges, and each long cutting edge 28 extends from the chisel edge 26 toward the outer peripheral side of the body 12. The two long cutting edges 28 may be located in rotational symmetry about the rotation axis S. Each long cutting edge 28 may be inclined with respect to the radial direction of the body 12, in other words, a direction orthogonal to the rotation direction T of the rotation axis S and the circumferential direction while approaching the rear end 12*b* side of the body 12 as approaching the rotation axis S. The cutting portion 14 includes a long rake face 30 located on the flute 18 side of each long cutting edge 28 and having a flat surface and a long flank face 32 that is adjacent to each long cutting edge 28 on the rear side in the rotation direction T and is flat. Each long cutting edge 28 is located at the intersection of each long rake surface 30 and each long flank surface 32. The two long flank faces 32 may be connected by the chisel edge 26. In other words, the chisel edge 26 may be located at the intersection of the two long flank faces 32.

The cutting portion 14 may include a corner portion 34 located at an end portion on the radially outer side of each long cutting edge 28. Each corner portion 34 is smoothly connected to the front end of the outer peripheral cutting edge 20, and may function as a cutting edge.

As illustrated in FIGS. 2, 3, and 5, the cutting portion 14 includes two short cutting edges 36 as end cutting edges located on the front end 12*a* side of the body 12, and each short cutting edge 36 extends from a position away from the chisel edge 26 toward the outer peripheral side of the body 12. The two short cutting edges 36 may be located rotationally symmetrically about the rotation axis S. Each short cutting edge 36 may be parallel to the radial direction of the body 12. The cutting portion 14 includes a short rake face 38 located on the flute 18 side of each short cutting edge 36 and having a flat surface and a short flank face 40 adjacent to each short cutting edge 36 on the rear side in the rotation direction T of the rotation axis S. Each short cutting edge 36 is located at the intersection of each short rake face 38 and each short flank face 40. The number of the short cutting edges 36 is not limited to two and may be one or three or more.

The cutting portion 14 may include a corner portion 42 located at an end portion on the radially outer side of each short cutting edge 36. Each corner portion 42 is smoothly connected to the front end of the outer peripheral cutting edge 20 and may have a function as a cutting edge.

As illustrated in FIGS. 2 and 3, each short flank face 40 includes a second flank face 44 that is adjacent to each short cutting edge 36 on the rear side in the rotation direction T of the rotation axis S and is flat and a third flank face 46 that is adjacent to each second flank face 44 on the rear side in the rotation direction T of the rotation axis S and is flat. When the body 12 is viewed from the front end 12*a*, a maximum value of a width C1 of each second flank face 44 in a direction orthogonal to each short cutting edge 36 is smaller than a maximum value of a width C2 of each third flank face 46 in the direction orthogonal to each short cutting edge 36. When the body 12 is viewed from the front end 12*a*, the maximum value of the width C1 of each second flank face 44 in the direction orthogonal to each short cutting edge 36 is smaller than a maximum value of a width C3 of each long flank face 32 in a direction orthogonal to each long cutting edge 28. When the body 12 is viewed from the front end 12*a*, each second flank face 44 may include a first region 44*a* having the constant width C1 in the direction orthogonal to each short cutting edge 36. The first region 44*a* of each second flank face 44 may be wider than the other regions of each second frank face 44.

As illustrated in FIGS. 6 and 7, a clearance angle θ1 of each second flank face 44 is smaller than a clearance angle θ2 of each third flank face 46. The clearance angle θ1 of each second flank face 44 is smaller than a clearance angle θ3 of each long flank face 32. The clearance angle θ2 of each third flank face 46 may be larger than the clearance angle θ3 of each long flank face 32.

As illustrated in FIGS. 2 and 3, the cutting portion 14 includes a gash face 48 located on the long rake face 30 side of each long cutting edge 28. Each gash face 48 is inclined with respect to the radial direction while approaching the rear end 12*b* of the body 12 as approaching the outer peripheral side of the body 12. As a result, the core thickness of the end mill 10 is avoided from becoming excessively thin while securing a space for flowing chips generated by the two long cutting edges 28.

According to the configuration of the end mill 10 of the present embodiment, as described above, the clearance angle θ1 of each second flank face 44 is smaller than the clearance angle θ3 of each long flank face 32. Thereby exhibiting the burnishing effect by each second flank face 44, and the surface roughness of the machined surface can be improved. Although a large cutting load is likely to be applied to each long cutting edge 28 as compared with the short cutting edge 36, the burnishing effect by each long flank face 32 is less likely to be exhibited, and the durability of each long cutting edge 28 can be improved by avoiding application of an excessive cutting load to each long cutting edge 28.

As described above, when the body 12 is viewed from the front end 12*a*, the maximum value of the width C1 of each second flank face 44 in the direction orthogonal to each short cutting edge 36 is smaller than the maximum value of the width C3 of each long flank face 32 in the direction orthogonal to each long cutting edge 28. Therefore, an excessive burnishing effect by each second flank face 44 is less likely to be exhibited, and application of an excessive cutting load to each short cutting edge 36 can be avoided to improve durability of each short cutting edge 36.

That is, the end mill 10 of the present embodiment can achieve both the improvement of the surface roughness of the machined surface and the durability of each long cutting edge 28 and each short cutting edge 36.

When the clearance angle θ2 of each third flank face 46 is larger than the clearance angle θ3 of each long flank face 32, the burnishing effect by each third flank face 46 is less likely to be exhibited. Thus, each third flank face 46 can prevent an excessive cutting load from being applied to each short cutting edge 36 and can further improve the durability of each short cutting edge 36.

When each short cutting edge 36 is parallel to the radial direction of the body 12, the cutting load applied to each short cutting edge 36 can be reduced and the durability of each short cutting edge 36 can be further improved. Here, each short cutting edge 36 being parallel to the radial direction of the body 12 means that each short cutting edge 36 is orthogonal to the rotation axis S as illustrated in FIG. 5. When each long cutting edge 28 is inclined with respect to the radial direction of the body 12 while approaching the rear end 12*b* side of the body 12 as approaching the rotation axis S, each long cutting edge 28 easily comes into contact with the workpiece in a stable manner. Here, each long cutting edge 28 being inclined with respect to the radial direction of the body 12 while approaching the rear end 12*b* side of the body 12 as approaching the rotation axis S means that the long cutting edge 28 is inclined toward the left side as approaching the rotation axis S in the example illustrated in FIG. 4. This can reduce the cutting load applied to each long cutting edge 28 and further improve the durability of each long cutting edge 28.

When the body 12 is viewed from the front end 12*a*, each second flank face 44 includes the first region 44*a* having the constant width C1 in the direction orthogonal to each short cutting edge 36. In this case, each second flank face 44 can stably exhibit the burnishing effect by each second flank face 44 and further improve the surface roughness of the machined surface. When the first region 44*a* of each second flank face 44 is wider than the other region of each second flank face 44, the burnishing effect by each second flank face 44 can be more stably exhibited, and the surface roughness of the machined surface can be further improved.

Figure 8:
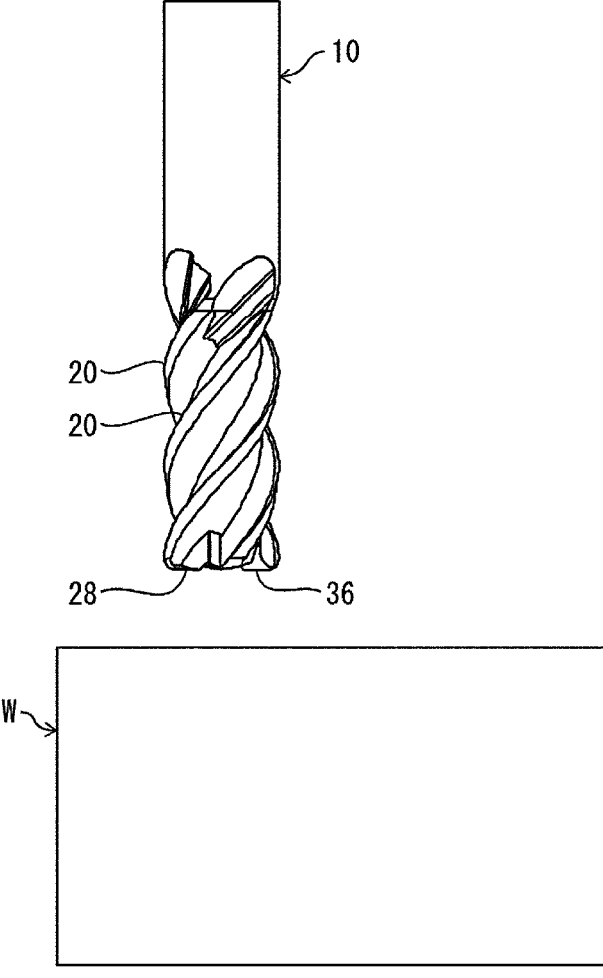
FIG. 8 is a schematic view illustrating a method for manufacturing a machined product according to an embodiment.
Figure 10:
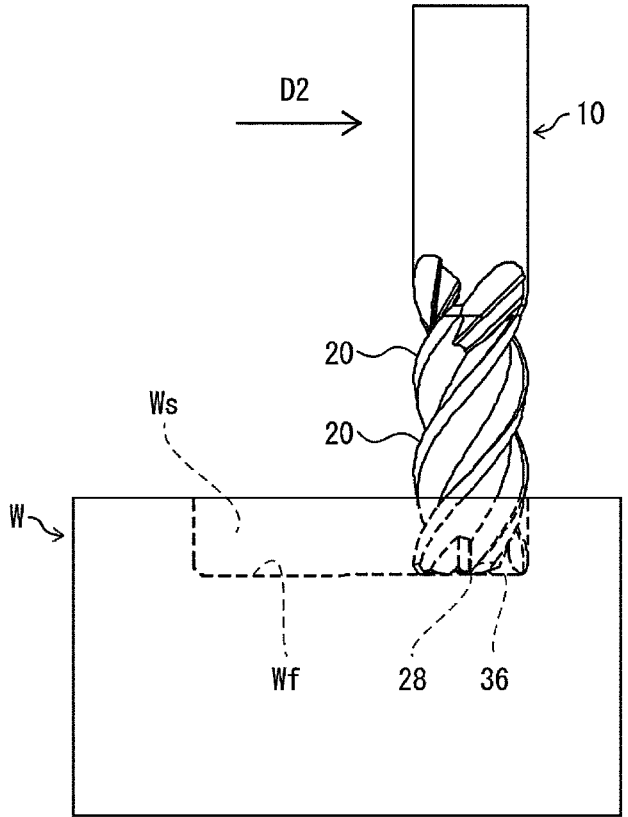
FIG. 10 is a schematic view illustrating a method for manufacturing a machined product according to an embodiment.
Figure 11:
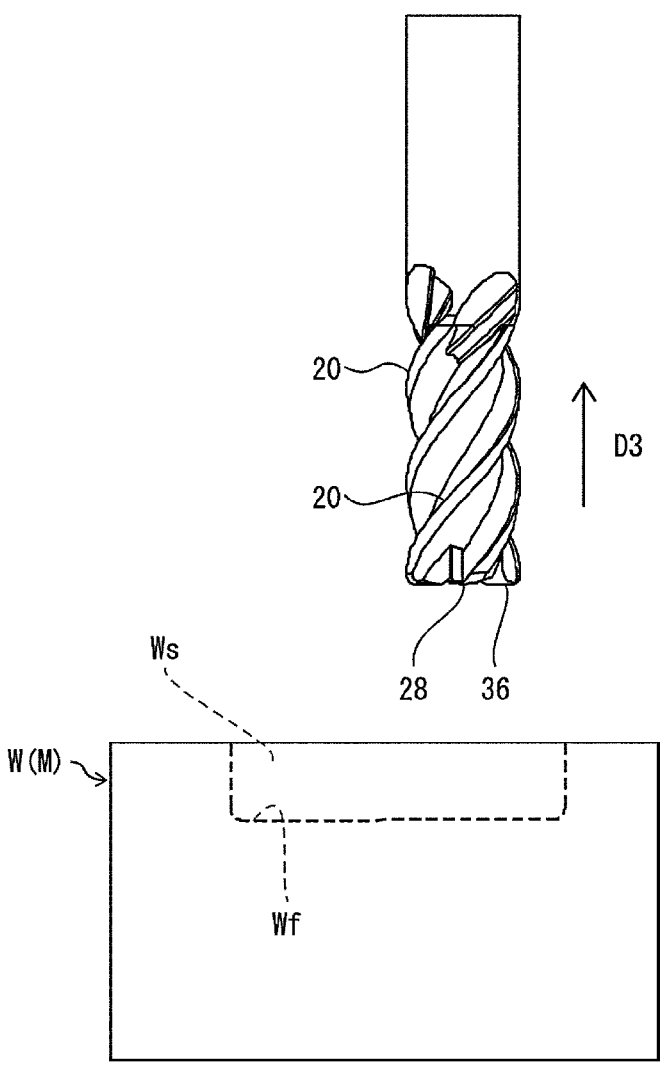
FIG. 11 is a schematic view illustrating a method for manufacturing a machined product according to an embodiment.

A method for manufacturing the machined product according to the embodiment will be described with reference to FIGS. 8 and 11. FIGS. 8 to 11 are schematic views illustrating the method for manufacturing the machined product according to the embodiment.

As illustrated in FIGS. 8 to 11, the method for manufacturing the machined product according to the embodiment is a method for manufacturing M a machined product which is the workpiece W after the machining, and includes a first step, a second step, and a third step. The first step is a step of rotating the end mill 10 as a rotary tool. The second step is a step of bringing the rotating end mill 10 into contact with the workpiece W. The third step is a step of separating the end mill 10 from the workpiece W. The specific content of the method for manufacturing the machined product according to the embodiment is as follows.

Figure 9:
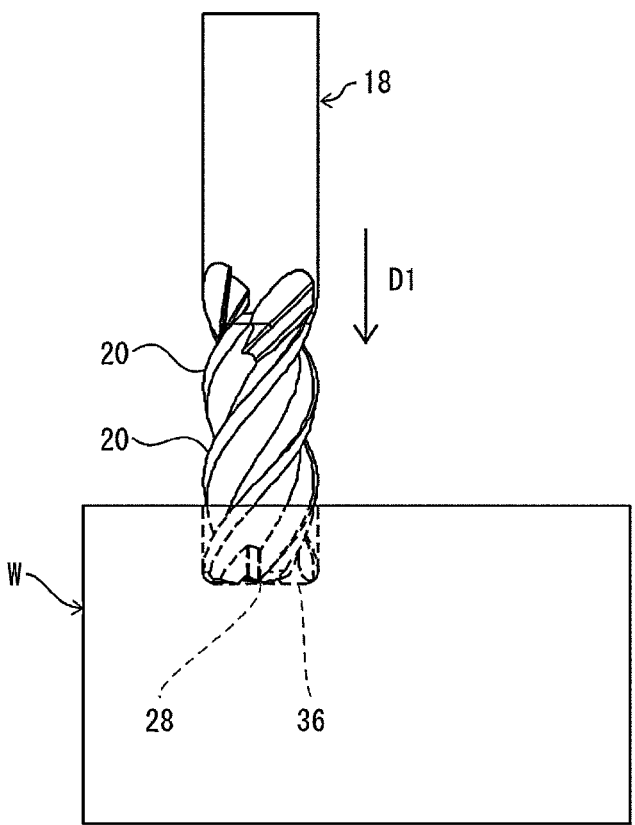
FIG. 9 is a schematic view illustrating a method for manufacturing a machined product according to an embodiment.

As illustrated in FIGS. 8 and 9, the end mill 10 is moved toward the workpiece W in the direction of an arrow D1 while being rotated in the rotation direction T of the rotation axis S. Next, as illustrated in FIG. 10, the rotating end mill 10 is moved in the direction of an arrow D2 while being in contact with the workpiece W. This allows machining, in other words, milling processing of the workpiece W to be performed. As a result, a machined bottom surface Wf is formed on the workpiece W by the two long cutting edges 28 and the two short cutting edges 36, and a machined side surface Ws is formed on the workpiece W by the plurality of outer peripheral cutting edges 20.

Then, as illustrated in FIG. 11, the end mill 10 is moved in the direction of an arrow D3 to be separated from the workpiece W. This completes the machining of the workpiece W and allows a machined product M which is the workpiece W after the machining to be manufactured. Since the end mill 10 has excellent cutting capabilities because of the above reasons, the machined product M excellent in machining accuracy can be manufactured.

When the machining is continued, the step of bringing the end mill 10 into contact with a different portion of the workpiece W may be repeated, while the end mill 10 is rotated. While the end mill 10 is brought close to the workpiece W in the present embodiment, the end mill 10 and the workpiece W may be relatively close to each other. Thus, for example, the workpiece W may be brought close to the end mill 10. In this respect, the end mill 10 is separated from the workpiece W in the same manner.

In the present disclosure, the invention has been described above based on the various drawings and examples. However, the invention according to the present disclosure is not limited to the above-described embodiments. That is, the embodiments of the invention according to the present disclosure can be modified in various ways within the scope illustrated in the present disclosure, and embodiments obtained by appropriately combining the technical means disclosed in different embodiments are also included in the technical scope of the invention according to the present disclosure. In other words, a person skilled in the art can easily make various variations or modifications based on the present disclosure. Note that these variations or modifications are included within the scope of the present disclosure.

REFERENCE SIGNS

10 End mill
12 Body
12*a* Front end (First end)
12*b* Rear end (Second end)
14 Cutting portion
16 Shank portion
18 Flute
20 Outer peripheral cutting edge
22 Rake face
24 Flank face 26 Chisel edge
28 Long cutting edge
30 Long rake face
32 Long flank face
34 Corner portion
36 Short cutting edge
38 Short rake face
40 Short flank face
42 Corner portion
44 Second flank face
44*a* First region
46 Third flank face
48 Gash face
S Rotation axis
T Rotation direction
W Workpiece
Wf Machined bottom surface
Ws Machined side surface

The invention claimed is:

1. A rotary tool, comprising:
a body extending from a first end toward a second end along a rotation axis and having a cylindrical shape, the body comprising:
    a chisel edge located on a side of the first end and intersecting the rotation axis;
    a long cutting edge located on a side of the first end and extending from the chisel edge toward an outer peripheral side;
    a long flank face that is adjacent to the long cutting edge rearward of the rotation axis in a rotation direction and is flat;
    a short cutting edge located on a side of the first end and extending toward an outer peripheral side from a position away from the chisel edge; and
    a short flank face adjacent to the short cutting edge rearward of the rotation axis in the rotation direction, the short flank face comprising:
    a second flank face that is adjacent to the short cutting edge rearward of the rotation axis in the rotation direction and is flat; and
    a third flank face that is adjacent to the second flank face rearward of the rotation axis in the rotation direction and is flat,
wherein, in front view of the body from the first end, a maximum value of a width of the second flank face in a direction orthogonal to the short cutting edge is smaller than a maximum value of a width of the long flank face in a direction orthogonal to the long cutting edge, and a clearance angle of the second flank face is smaller than a clearance angle of the long flank face.

2. The rotary tool according to claim 1, wherein a clearance angle of the third flank face is larger than the clearance angle of the long flank face.

3. The rotary tool according to claim 1, wherein the short cutting edge is orthogonal to the rotation axis.

4. The rotary tool according to claim 3, wherein the long cutting edge is inclined to the rotation axis and is closer to the second end as close to the rotation axis.

5. The rotary tool according to claim 1, wherein in front view of the body from the first end, the second flank face has a first region in which a width in the direction orthogonal to the short cutting edge is constant.

6. The rotary tool according to claim 5, wherein the first region of the second flank face is wider than other regions of the second flank face.

7. A method for manufacturing a machined product, the method comprising:
rotating a rotary tool according to claim 1;
bringing the rotary tool that is rotating into contact with a workpiece; and
separating the rotary tool from the workpiece.

8. The rotary tool according to claim 1, wherein
the body further comprises a first flute extending from the long cutting edge toward the second end, and
the first flute comprises a first rake face which is flat and is connected to the long cutting edge.

9. The rotary tool according to claim 1, wherein
the body further comprises a second flute extending from the second cutting edge toward the second end, and
the second flute comprises a second rake face which is flat and is connected to the short cutting edge.

10. The rotary tool according to claim 1, wherein
the body comprises two long flank faces, and
the chisel edge is located at an intersection of the long flank faces.

11. The rotary tool according to claim 1, wherein, in front view of the body from the first end, a maximum value of a width of the second flank face in a direction orthogonal to the short cutting edge is smaller than a maximum value of a width of the third flank face in a direction orthogonal to the long cutting edge.

12. The rotary tool according to claim 1, wherein
the third flank face is inclined the second flank face.

* * * * *